United States Patent
Gajewski

[11] Patent Number: 5,382,047
[45] Date of Patent: Jan. 17, 1995

[54] SUPPLEMENTAL INFLATABLE RESTRAINT COVER ASSEMBLY WITH A PERFORATED SUBSTRATE

[75] Inventor: Gerry Gajewski, Dover, N.H.

[73] Assignee: Davidson Textron, Dover, N.H.

[21] Appl. No.: 92,444

[22] Filed: Jul. 14, 1993

[51] Int. Cl.⁶ .............................................. B60R 21/20
[52] U.S. Cl. ................... 280/728 B; 280/732
[58] Field of Search ............... 280/728 B, 732, 731, 280/730 R, 728 R, 752

[56] References Cited

U.S. PATENT DOCUMENTS

| | | | |
|---|---|---|---|
| 4,148,503 | 4/1979 | Shiratori et al. | 280/728 B |
| 4,836,576 | 6/1989 | Werner et al. | 280/731 |
| 4,878,689 | 11/1989 | Mitzkus et al. | 280/731 |
| 4,893,833 | 1/1990 | DiSalvo et al. | 280/732 |
| 4,925,209 | 5/1990 | Sakurai | 280/728 B |
| 4,989,896 | 2/1991 | DiSalvo et al. | 280/728 B |
| 5,013,064 | 5/1991 | Miller et al. | 280/728 B |
| 5,035,444 | 7/1991 | Carter | 280/732 |
| 5,046,758 | 9/1991 | Rafferty et al. | 280/732 |
| 5,066,037 | 11/1991 | Castrigno et al. | 280/732 |
| 5,069,477 | 12/1991 | Shiraki | 280/72 |
| 5,072,967 | 12/1991 | Batchelder et al. | 280/732 |
| 5,082,310 | 1/1992 | Bauer | 280/732 |
| 5,096,221 | 3/1992 | Combs et al. | 280/732 |
| 5,110,647 | 5/1992 | Sawada et al. | 280/728 B |
| 5,118,132 | 6/1992 | Nakajima | 280/728 B |
| 5,125,683 | 6/1992 | Nakajima | 280/731 |
| 5,131,678 | 7/1992 | Gardner et al. | 280/728 B |
| 5,154,444 | 10/1992 | Nelson | 280/728 B |
| 5,158,322 | 10/1992 | Sun | 280/732 |
| 5,161,819 | 11/1992 | Rhodes, Jr. | 280/728 B |
| 5,183,289 | 2/1993 | Zeller et al. | 280/728 B |
| 5,256,354 | 10/1993 | Chadwick | 280/732 |

FOREIGN PATENT DOCUMENTS

| | | | |
|---|---|---|---|
| 4137926 | 5/1992 | Germany | 280/728 B |
| 5038995 | 2/1993 | Japan | 280/732 |
| 5042857 | 2/1993 | Japan | 280/732 |

*Primary Examiner*—Kenneth R. Rice
*Assistant Examiner*—Peter C. English
*Attorney, Agent, or Firm*—Reising, Ethington, Barnard, Perry & Milton

[57] ABSTRACT

A cover assembly for concealing a supplemental inflatable restraint (SIR) system in a vehicle passenger compartment is formed as an integral part of an automotive instrument panel. The cover assembly has a perforated substrate of ductile metal. The perforations are diamond shaped and form a lattice of stretchable cross members. Selected cross members are weakened to define a door edge. The inflating airbag pushes against the lattice to stretch and deform the cross members so as to create an opening at the door edge for deployment of the airbag into the passenger compartment. The cover assembly includes a decorative vinyl shell and a foam layer between the shell and substrate. The vinyl shell includes weakened sections aligned with the door edge of the substrate.

21 Claims, 3 Drawing Sheets

SUPPLEMENTAL INFLATABLE RESTRAINT COVER ASSEMBLY WITH A PERFORATED SUBSTRATE

BACKGROUND OF THE INVENTION

This invention relates generally to supplemental inflatable restraint (SIR) or airbag systems and more particularly to a cover assembly for concealing an SIR system in a vehicle passenger compartment.

U.S. Pat. No. 4,893,833 granted to Anthony J. DiSalvo and David J. Bauer Jan. 16, 1990 discloses a closure arrangement for an airbag deployment opening formed in an automotive instrument panel. The closure arrangement includes a closure panel positioned in the opening and hinged along one side, with a frangible lock on the opposite side that is fractured by pressure exerted by the deploying airbag. The closure panel comprises a core of lightweight rigid foam plastic bonded to a formed aluminum substrate and an outer vinyl skin. The closure panel is hinged along one edge by an extension strip of the aluminum substrate which is bolted to a structural support plate beneath the instrument panel.

There are several disadvantages to this single door closure arrangement. One disadvantage is that the closure panel is manufactured and installed as a separate unit which is not economical. The separate unit also has a visible outline that detracts from the appearance of the instrument panel.

U.S. Pat. No. 5,082,310 granted to David J. Bauer Jan. 21, 1992 discloses another arrangement for providing an airbag deployment opening in an automotive instrument panel involving an aluminum substrate. In this arrangement shown in FIGS. 9-11 of the patent, an aluminum substrate has a weakened bridging portion which is split apart to form contiguous doors. This dual door arrangement has the same drawbacks as the single door arrangement of U.S. Pat. No. 4,893,833.

U.S. Pat. No. 5,082,310 also discloses an invisible door arrangement in FIGS. 12-14 of the patent. This arrangement comprises a molded plastic substrate that also has weakened bridging portions that are split apart by the deploying airbag. This solves the appearance problem. However, the arrangement is still expensive to manufacture because the plastic substrate is made separately and attached to the adjacent substrate layer of the instrument panel before the foam layer is molded as shown in FIG. 13 of the patent. The specification states that the substrate may alternately be of integral construction. However, the specification and drawing do not show or describe details of any such integral construction.

U.S. Pat. No. 5,096,221 granted to Richard Combs and Scott Rafferty Mar. 17, 1992 discloses an automotive instrument panel having a separate tethered airbag door. The door has two substrates. The first metal substrate has construction holes for receiving fill nozzles on standard mold apparatus lids and holes to locate the substrate in the mold so as to form a sealed connection with respect to the outer cover and to define a space into which foam precursors are directed in a known manner. The second plastic substrate is fastened to the first substrate in a juxtaposed relationship so as to cover the holes. U.S. Pat. No. 5,161,819 granted to Richard D. Rhodes, Jr. Nov. 10, 1992 also discloses an airbag door with two substrates including a first metal substrate that has construction holes and locating holes and a second plastic substrate. While the arrangement of these two patents are improvements over the arrangement of U.S. Pat. No. 4,893,833, the arrangements have generally the same cost and appearance disadvantages.

U.S. Pat. No. 4,878,689 granted to Jurgen Mitzkus and Dieter Wiesner Nov. 7, 1989 discloses a steering wheel having a dual door arrangement for an airbag. Each airbag door has an aluminum substrate that is embedded in a foamed plastic. Each substrate has an arched outer edge region perforated by a plurality of holes arranged in two parallel rows so that the arched outer region acts as a hinge so that the door springs open easily.

U.S. Pat. No. 4,836,576 granted to Herbert Werner et al Jun. 6, 1989 discloses another steering wheel having a dual door arrangement. Each door has a polyamide reinforcing layer that is formed with apertures so that the reinforcing layer and the polyurethane foam layer of the covering will be held and will be anchored more effectively.

SUMMARY OF THE INVENTION

The object of this invention is to provide a cover assembly for an SIR system that is economical to manufacture and that has an attractive appearance.

A feature and advantage of the cover assembly of this invention is that the cover assembly includes a substrate that can be provided as an integral part of a trim panel substrate easily and economically.

Another feature and advantage of the cover assembly of this invention is that the cover assembly includes a substrate of ductile metal that is perforated to provide an opening for deploying an airbag responsive to the pressure exerted by the deploying airbag without any need for a hinge or tether.

Still another feature and advantage of the cover assembly of this invention is that the cover assembly includes a perforated metal substrate that has diamond shaped openings forming a lattice that is firm enough to hold the shape of the trim panel yet ductile enough to provide an opening for deployment of an airbag responsive to the pressure exerted by the inflating airbag.

Yet another feature of the cover assembly of this invention is that the cover assembly includes a perforated substrate of ductile metal that stretches to form a dome and a crescent shaped opening for deployment of an airbag so that the cover assembly is particularly well suited for use in a horizontal trim panel such as the top of an instrument panel.

Still yet another feature of the cover assembly of this invention is that the cover assembly includes a perforated metal substrate that has diamond shaped openings that are proportioned and oriented to facilitate creation of a crescent shaped opening for deployment of an airbag.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
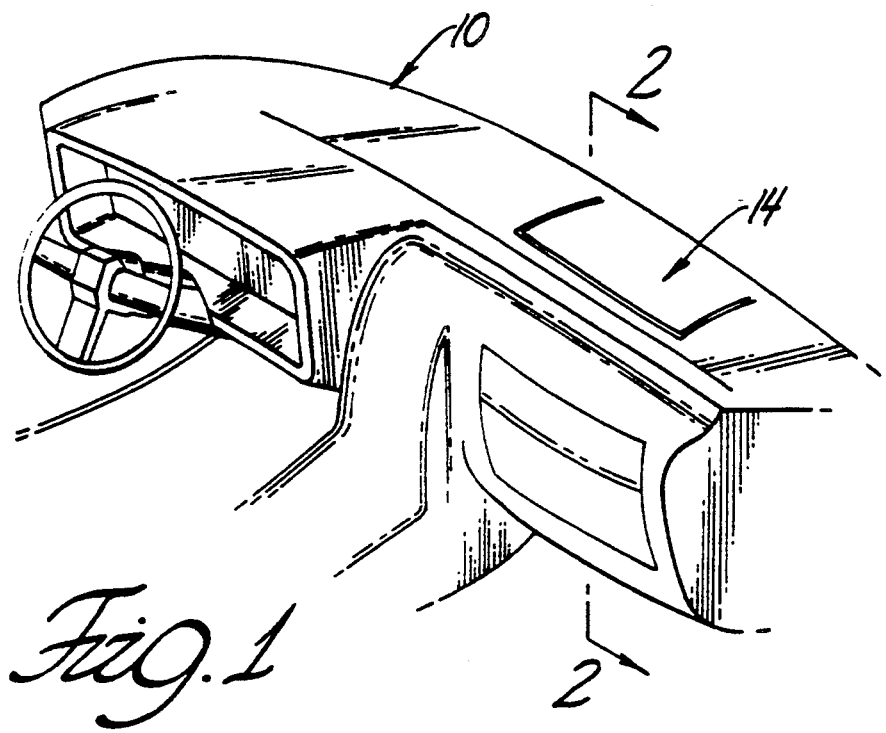
FIG. 1 is a perspective view of an automotive instrument panel that includes a cover assembly in accordance with this invention.
Figure 2:
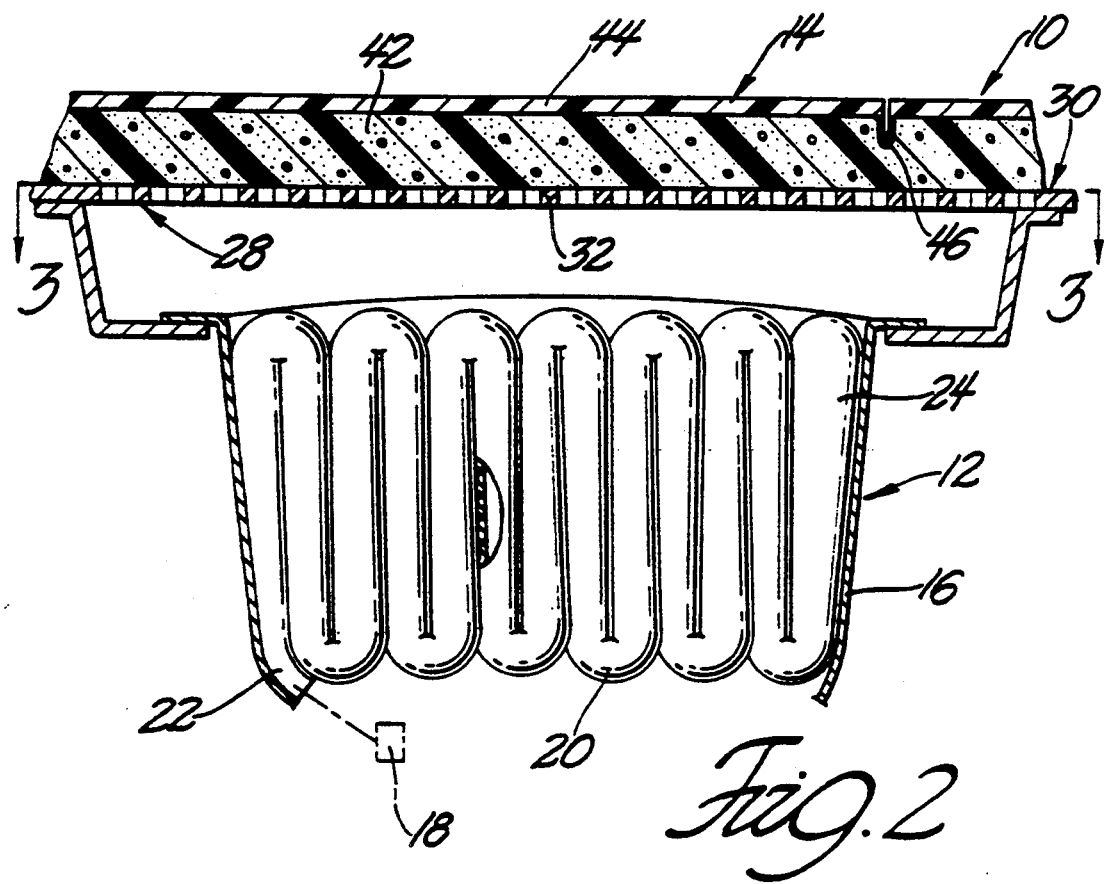
FIG. 2 is a fragmentary sectional view of the automotive instrument panel taken substantially along the line 2—2 of FIG. 1 looking in the direction of the arrows.

Referring now to the drawing, FIG. 1 shows an automotive instrument or trim panel 10 having a supplemental inflatable restraint (SIR) system 12 located beneath a cover assembly 14 constructed in accordance with this invention.

The SIR system 12 includes an airbag housing 16 that encloses a gas generator 18 for supplying an inflatant to an airbag 20 that is collapsed, folded and packed in the housing 16. The folded airbag 20 includes an inlet end 22 connected to a passage for flow of the inflatant from the gas generator 18 into the airbag. The airbag also includes a nose end 24 at the opposite end of the folds that is positioned to operate the cover assembly 14 of this invention when the airbag 20 inflates.

Figure 3:
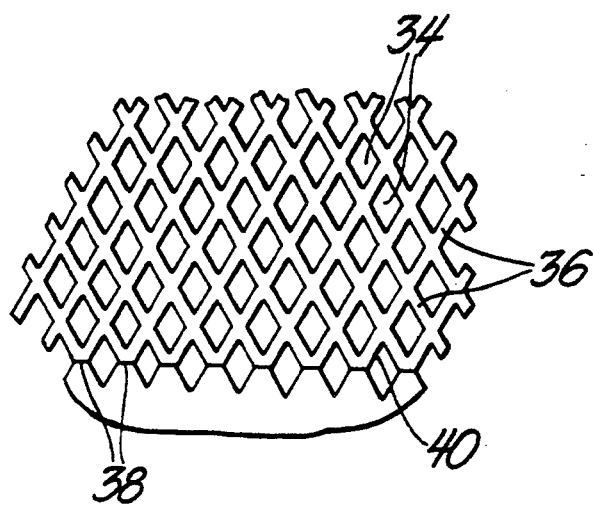
FIG. 3 is a fragmentary sectional view of the automotive instrument panel taken substantially along the line 3—3 of FIG. 2 looking in the direction of the arrows.

The cover assembly 14 comprises a substrate section 28 of ductile metal, such as sheet steel that is an integral part of the substrate 30 that is insert molded as part of the instrument panel 10 itself. The substrate section 28 includes a perforated portion 32 that has a pattern of diamond shaped holes 34 that create a lattice comprised of metal cross bars 36 as best shown in FIG. 3. The lattice is weakened by cuts 38 through selected cross bars 36 that define a door edge 40 that intersects a line of diamond shaped holes 34 that runs cross car, that is in the lateral direction of the vehicle.

The outer surface of the substrate 30 including the substrate section 28 is bonded to a layer of a suitable energy absorbing elastomeric foam, such as urethane foam that forms a cushion 42 in an underlying relationship to a polymeric skin or shell 44 of vinyl or the like that forms an outer decorative surface of the automotive instrument panel 10. The skin 44 preferably has a weakened section 46 that is aligned with portions of the door edge 40.

This weakened section 46 of the shell 44 may be provided in any suitable manner. One way is to form a depression of thinner section by a water jet stream. This produces somewhat of an invisible door appearance for the shell 44. A weakened section could also be provided by molding or cutting a notch in the under surface of the shell 44. The shell 44 can also be perforated from the back side by a water jet to cut the portions of the shell 44 exposed between the cross bars 36 of the substrate section 28.

Figure 4:
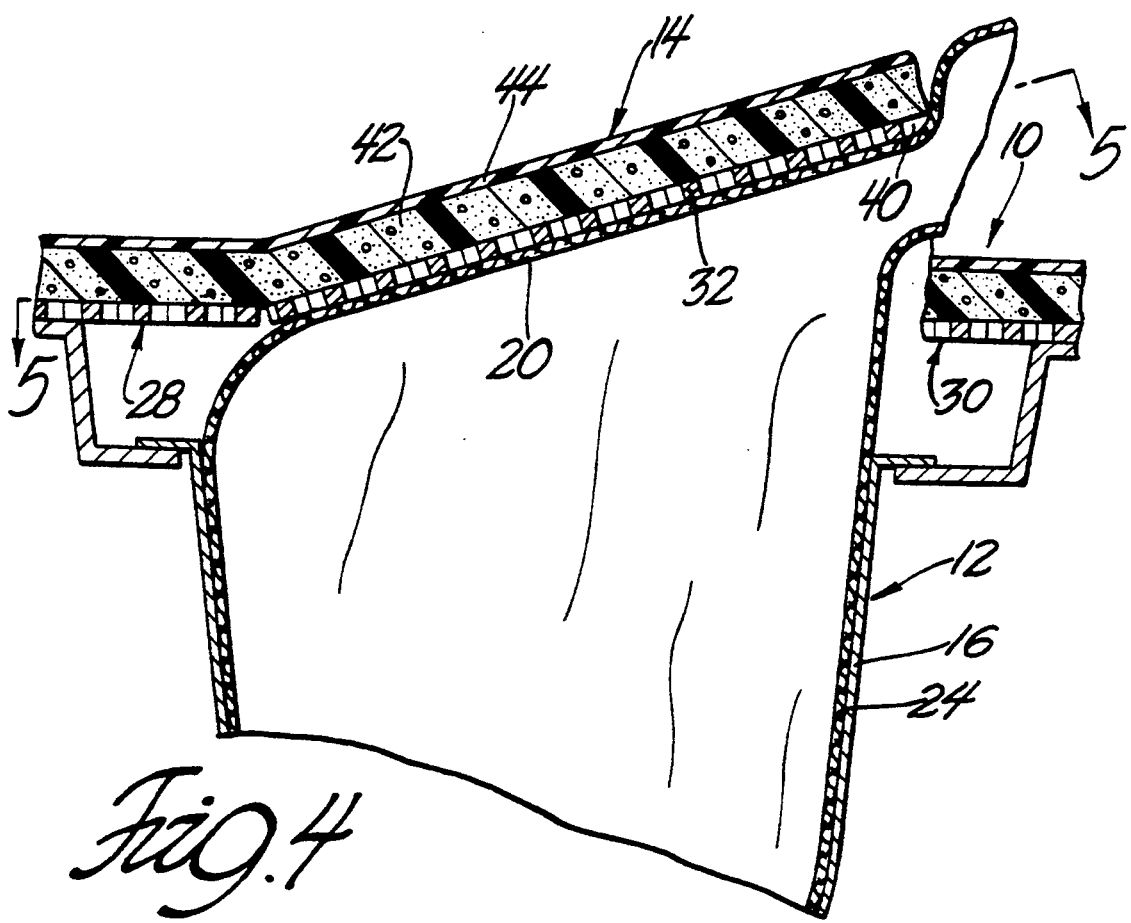
FIG. 4 is a fragmentary sectional view similar to FIG. 2 showing the automotive instrument panel of FIG. 1 during deployment of the airbag.
Figure 5:
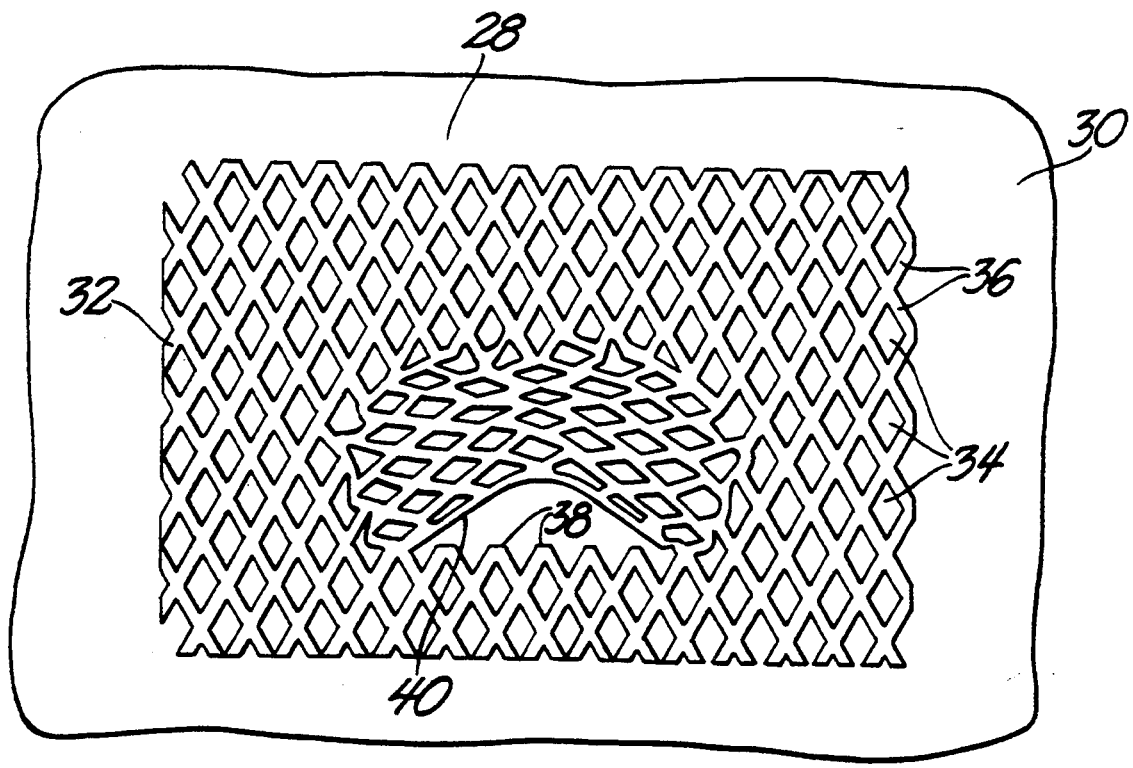
FIG. 5 is a fragmentary sectional view of the automotive instrument panel taken substantially along the line 5—5 of FIG. 4 looking in the direction of the arrows.

The cover assembly 14 of this invention provides a door arrangement for the deployment of the airbag 20 in the following manner. When the gas generator 18 is triggered due to a predetermined vehicle deceleration, the airbag 20 inflates at the nose end 24 first and then progressively back toward the inlet end 22. The nose end 24 engages the substrate section 28 and the pressure exerted on the substrate section 28 by the inflating airbag separates the substrate section 28 at the door edge 40 and then pushes the lattice outwardly to stretch and permanently deform the cross bars 36 to create a dome having a crescent shaped opening as shown in FIGS. 4 and 5.

The diamond shaped holes 34 are preferably elongated and oriented with their longer diagonal in the longitudinal direction of the vehicle and their shorter diagonal running cross car or in the lateral direction of the vehicle. This orientation of the shorter diagonal in the same direction as the single door edge 40 facilitates creation of the dome and crescent shaped opening because the intersections of the cross bars 36 must move away from each other in the lateral or cross car direction for the most part. Thus the intersections of the cross bars 36 have more space to move toward each other in the longitudinal direction as the cross bars stretch and the intersections of the cross bars move away from each other in the lateral direction. This results in the diamond shaped openings elongating in the lateral direction when the dome and crescent shaped opening are formed.

The diamond shaped holes 34 are uniformly signed and spaced as shown in FIG. 3. However, the size and spacing of the diamond shaped holes can be varied to control the size and shape of the dome and the crescent shaped opening that are formed.

While the invention has been described in connection with a perforated door opening having a single, relatively linear door edge 40, multiple door edges are also possible. For instance, the cross bars 36 can be weakened by two additional laterally spaced cuts along longitudinal lines to provide three door edges in a U-shaped pattern which creates a door that opens like a flap. In such an instance the weakened pattern in the vinyl is also modified to provide a weakened section in a corresponding U-shaped pattern in alignment with the three door edges.

Figure 6:
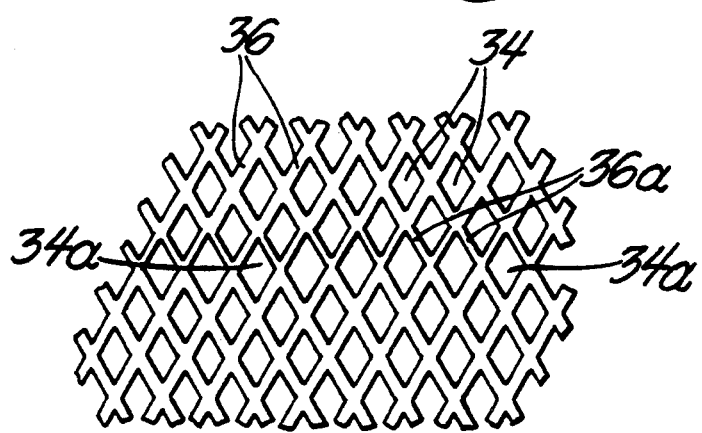
FIG. 6 is a fragmentary sectional view similar to FIG. 3 of a second embodiment of the invention.

It is also possible to weaken the cross bars in other ways. For instance the diamond shaped holes need not be uniformly sized and spaced as shown in FIG. 3. Some diamond shaped holes 34a could be enlarged and/or placed close together as shown in FIG. 6 so that selected cross bars 36 are relatively thin or "weakened" in comparison to the other cross bars 36. This produces frangible lines or zones that cooperate with lines of diamond shaped holes to define a door edge or edges. In this alternative, the pressure exerted by the inflating airbag fractures the weakened cross bars at the frangible lines or zones.

Moreover, the cover assembly 14 has been illustrated in conjunction with the top of the automotive instrument panel 10 on the passenger side of the vehicle. Even though the cover assembly 14 of this invention is particularly well suited for this application, with proper modification, it can be used on the driver side and incorporated in the trim pad of the steering wheel; on either side and incorporated in the front or facing portion of the automotive instrument panel; or incorporated in any other suitable trim panel in the passenger compartment.

In other words the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A cover assembly for concealing a supplemental inflatable restraint system in a vehicle passenger compartment comprising:
   a substrate of ductile metal secured beneath a trim panel in a vehicle passenger compartment;
   the substrate having a perforated portion that has a plurality of holes that create a lattice of stretchable members, selected ones of the members being weakened to define a door edge that creates a crescent shaped opening in the trim panel for deployment of an airbag when an inflating airbag exerts a predetermined pressure on the perforated portion of the substrate and pushes the lattice outwardly to create a dome.

2. The cover assembly as defined in claim 1 wherein the holes are elongated.

3. The cover assembly as defined in claim 2 wherein the holes are diamond shaped.

4. The cover assembly as defined in claim 1 wherein the holes are diamond shaped.

5. A cover assembly for concealing a supplemental inflatable restraint system in a vehicle passenger compartment comprising:
   a substrate of ductile metal secured beneath a trim panel in a vehicle passenger compartment;
   the substrate having a perforated portion that has a plurality of holes that create a lattice of stretchable cross bars,
   selected ones of the cross bars being weakened to define a door edge that creates a crescent shaped opening in the trim panel for deployment of an airbag when an inflating airbag exerts a predetermined pressure on the perforated portion of the substrate to create a dome.

6. The cover assembly as defined in claim 5 wherein the holes are uniformly sized and spaced and the selected cross bars are weakened by cuts to define the door edge, and wherein the door edge intersects a line of holes.

7. The cover assembly as defined in claim 5 wherein the holes creating the selected one of the cross bars are larger and/or spaced closer together than the other holes so that the selected ones of the cross bars are weakened by being thinner than the cross bars created by the other holes.

8. The cover assembly as defined in claim 5 wherein the door edge is a single generally linear door edge.

9. The cover assembly as defined in claim 5 wherein the door edge is a plurality of door edges in a U-shaped pattern.

10. The cover assembly as defined in claim 5 wherein an outer surface of the substrate is bonded to an elastomeric cushion formed in an underlying relationship to a polymeric skin that forms an outer surface of the trim panel.

11. The cover assembly as defined in claim 10 wherein the skin has a weakened section in alignment with the door edge of the substrate.

12. The cover assembly as defined in claim 5 wherein the substrate is an integral part of a substrate that is insert molded as part of the trim panel.

13. A cover assembly for concealing a supplement inflatable restraint assembly in a vehicle passenger compartment comprising:
    a substrate of ductile metal secured beneath a horizontal trim panel in a vehicular passenger compartment;
    the substrate having a perforated portion that has a pattern of diamond shaped holes which create a lattice of stretchable cross bars,
    selected ones of the cross bars being weakened to define a door edge that extends in a cross car direction and that creates a crescent shaped opening in the trim panel for deployment of an airbag when the inflating airbag exerts a predetermined pressure on the perforated portion of the substrate to create a dome.

14. The cover assembly as defined in claim 13 wherein the diamond shaped holes are uniformly sized and spaced and the selected cross bars are weakened by cuts to define the door edge and wherein the door edge intersects a line of diamond shaped holes.

15. The cover assembly as defined in claim 13 wherein the diamond shaped holes are non-uniformly sized and/or spaced to weaken the selected cross bars.

16. A cover assembly for concealing supplemental inflatable restraint assembly in a vehicle passenger compartment comprising:
    a substrate of ductile metal secured beneath a horizontal trim panel in a vehicle passenger compartment;
    the substrate having a perforated portion that has a pattern of diamond shaped holes which create a lattice of cross bars,
    selected ones of the cross bars being weakened to define a door edge that extends in a cross car direction and that crates an opening in the trim panel for deployment of an airbag when the inflating airbag exerts a predetermined pressure on the perforated portion of the substrate,
    the diamond shaped holes being elongated and oriented so that their shorter diagonal is in the cross car direction.

17. The cover assembly as defined in claim 16 wherein the diamond shaped holes are uniformly sized and spaced and the selected cross bars are weakened by cuts to define the door edge, and wherein the door edge intersects a line of diamond shaped holes.

18. The cover assembly as defined in claim 16 wherein the diamond shaped holes creating the selected cross bars are larger and/or spaced closer together than the other diamond shaped holes so that the selected cross bars are weakened by being thinner than the cross bars created by the other diamond shaped holes.

19. The cover assembly as defined in claim 16 wherein the door edge is a single generally linear door edge.

20. The cover assembly as defined in claim 16 wherein the door edge is a plurality of door edges in a U-shaped pattern.

21. The cover assembly as defined in claim 16 wherein an outer surface of the substrate is bonded to an elastomeric cushion formed in an underlying relationship to a polymeric skin that forms an outer surface of the trim panel, wherein the skin has a weakened section in alignment with the door edge of the substrate, and wherein the substrate is an integral part of a substrate that is insert molded as part of the trim panel.

* * * * *